US005871851A

United States Patent [19]

[11] Patent Number: 5,871,851

[45] Date of Patent: Feb. 16, 1999

Fukumizu et al.

[54] MAGNETIC SHIELDING MATERIAL FOR TELEVISION CATHODE-RAY TUBE AND PROCESS FOR PRODUCING THE SAME

[75] Inventors: Keisuke Fukumizu; Hiroaki Kato; Teruo Takeuchi, all of Tokyo; Takahide Shimazu; Yasuo Sato, both of Himeji; Tatsuo Amaike, Tokyo; Ryoichi Yoshihara; Takeshi Harada, both of Himeji, all of Japan

[73] Assignees: Nippon Steel Corporation; Sony Corporation, both of Tokyo, Japan

[21] Appl. No.: 920,174

[22] Filed: Aug. 25, 1997

[51] Int. Cl.[6] ............................... B32B 15/18; C21D 8/12

[52] U.S. Cl. ........................... 428/667; 428/679; 148/537

[58] Field of Search .................................... 428/679, 667; 148/537, 529, 518; 313/402; 174/35 MS

[56] References Cited

U.S. PATENT DOCUMENTS

| | | | |
|---|---|---|---|
| 4,196,025 | 4/1980 | Davies | 148/36 |
| 4,309,886 | 1/1982 | Kubota et al. | 72/202 |
| 4,793,869 | 12/1988 | Krauss et al. | 148/12.1 |
| 5,507,677 | 4/1996 | Michalchuk | 445/68 |
| 5,509,842 | 4/1996 | Nosker | 445/37 |
| 5,618,401 | 4/1997 | Nomura et al. | 205/130 |
| 5,625,251 | 4/1997 | Nosker et al. | 313/403 |
| 5,629,051 | 5/1997 | Poliniak et al. | 427/475 |
| 5,646,478 | 7/1997 | Nosker et al. | 313/402 |

FOREIGN PATENT DOCUMENTS

| | | |
|---|---|---|
| 2-282423 | 11/1990 | Japan . |
| 3-146644 | 6/1991 | Japan . |
| 5-64698 | 9/1993 | Japan . |

*Primary Examiner*—John J. Zimmerman
*Attorney, Agent, or Firm*—Kenyon & Kenyon

[57] ABSTRACT

A 0.1 to 0.5 mm-thick plated steel sheet having high coercive force and magnetic flux density is provided by hot rolling a slab comprising by weight carbon: 0.01 to 0.09%, silicon: not more than 1.0%, phosphorus: not more than 0.3%, manganese: not more than 1.5%, sulfur: not more than 0.04%, aluminum: not more than 1.0%, and nitrogen: not more than 0.01% with the balance consisting of iron and unavoidable impurities, cold rolling the hot rolled sheet, annealing the cold rolled sheet to prepare a steel sheet having an average grain diameter of 3 to 15 $\mu$m, temper rolling the steel sheet with a reduction ratio of not more than 3%, and plating the temper rolled sheet with chromium or nickel. This enables the provision of a magnetic shielding material having no significant drift and very good electron beam landing properties.

6 Claims, No Drawings

MAGNETIC SHIELDING MATERIAL FOR TELEVISION CATHODE-RAY TUBE AND PROCESS FOR PRODUCING THE SAME

BACKGROUND OF THE INVENTION (1) Field of the Invention

The present invention relates to a magnetic shielding material for a television (TV) cathode-ray tube, particularly for a color TV cathode-ray tube, and more particularly to a material of a magnetic shielding component disposed on the interior or exterior of the cathode-ray tube to surround an electron beam in a funnel of the tube, that is, a magnetic shielding material for a TV cathode-ray tube, and a process for producing the same.

(2) Description of the Prior Art

A color TV cathode-ray tube basically comprises an electron gun and a fluorescent screen for converting an electron beam to an image and, further, a magnetic shielding component, for preventing the electron beam from being deflected by geomagnetism, surrounding an inside of the funnel of the cathode-ray tube. This magnetic shielding component is known also as an inner shielding component or an inner magnetic shielding component. In some cases, an outer shielding component for shielding geomagnetism on the exterior of the cathode-ray tube is used. In the present invention, the materials for these components are generally called "magnetic shielding materials."

The magnetic shielding material is generally a steel sheet having a thickness of 0.1 to 0.5 mm, and a coil of this steel sheet is pressed by an electric appliance manufacturer and then incorporated into the interior of the cathode-ray tube. In order to shield geomagnetism, it is common practice to use a method wherein a degaussing coil wound around the exterior of the color cathode-ray tube is energized by an alternating current and an anti-magnetic field is created by the residual magnetism in the interior of the inner shield component to reduce the effect of external geomagnetism.

The general properties required of the magnetic shielding material are a high magnetic permeability $\mu$, in the geomagnetic field (a very low strength magnetic field of about 0.3 Oe (Oe is oersted)), necessary for facilitating passage of magnetism, and a low coercive force Hc for improving the degaussing properties (elimination of residual magnetism). In order to ensure the above magnetic properties of the magnetic shielding material, in Japanese Unexamined Patent Publication (Kokai) No. 2-282423, aluminum (not more than 0.001%) as the constituent of steel is minimized, and, at the same time, boron is added so that the fine precipitate in the steel is brought to substantially BN alone, thereby attempting to improve the magnetic permeability and to lower the coercive force and, at the same time, to improve the press moldability.

Similarly, in order to improve the magnetic properties, moldability, spot weldability, graphitizability and other properties of the magnetic shielding material, Japanese Unexamined Patent Publication (Kokai) No. 3-146644 discloses a technique, where the total amount of silicon, manganese, and aluminum is specified and a given amount of boron is added, and describes that, in this case, a coercive force of not more than 1 Oe at a magnetic field of 10 Oe is desired.

Further, Japanese Examined Patent Publication (Kokoku) No. 5-64698 discloses an inner shielding material wherein, in order to improve the magnetic properties of the inner shielding material for a TV cathode-ray tube, the grain size and residual strain are regulated to provide an inner shielding material having a magnetic permeability of not less than 750 emu and a coercive force of not more than 1.2 Oe (maximum magnetizing force 10 Oe) at a d.c. magnetic field of 0.3 Oe.

In recent years, however, the size and the width of domestic TVs have been markedly increased, lengthening the travel distance and scanning distance of an electron beam and increasing the migration of the electron beam deflected by the geomagnetism. This is causative of color shading. A demand for personal computers has been rapidly increased, and since the image on the monitor of the personal computers is a static image and viewed at short range, what is particularly required is a landing property of a high precision electron beam.

That is, at the present time, there is a strong demand, in TV cathode-ray tubes, for a magnetic shielding material which can reduce the drift of electron beam landing.

SUMMARY OF THE INVENTION

Accordingly, an object of the present invention is to provide a magnetic shielding material which, in TV cathode-ray tubes, can reduce the drift of electron beam landing.

Another object of the present invention is to provide a magnetic shielding material which, particularly when used as an inner shielding material for TV cathode-ray tubes of aperture grill system, causes no significant drift of electron beam landing.

Thus, according to the present invention, a 0.1 to 0.5 mm-thick plated steel sheet having high coercive force and magnetic flux density can be provided by hot rolling a slab comprising by weight carbon: 0.01 to 0.09%, silicon: not more than 1.0%, phosphorus: not more than 0.3%, manganese: not more than 1.5%, sulfur: not more than 0.04%, aluminum: not more than 1.0%, and nitrogen: not more than 0.01% with the balance consisting of iron and unavoidable impurities, cold rolling the hot rolled sheet, annealing the cold rolled sheet to prepare a steel sheet having a texture of 3 to 15 $\mu$m in average diameter, temper rolling the steel sheet with a reduction ratio of not more than 3%, and plating the temper rolled sheet with chromium or nickel.

This enables the provision of a magnetic shielding material having a very high electron beam landing of not more than 50 $\mu$m in terms of drift.

These and other objects and many of the attendant advantages of this invention will be readily appreciated from the following detailed description.

DETAILED DESCRIPTION OF THE INVENTION

The present invention will be described in detail.

The present invention involves the following four features. Firstly, in the cathode-ray tube of the aperture grill system, the larger the coercive force and the residual magnetic flux density, the smaller the drift. Secondly, the content of carbon in the steel sheet is regulated in a predetermined range to increase the coercive force. Thirdly, the grain diameter of the product is reduced to increase the residual magnetic flux density and the coercive force. Fourthly, the grain diameter is regulated by annealing, and the strength is controlled and the shape of the steel sheet is straightened by temper rolling.

The reasons for the limitation of constituents of the material according to the present invention will be described. In the following description, all "%" are by weight.

The carbon content of the product material is not less than 0.01%, particularly 0.025 to 0.09%. Increasing the carbon content results in increased coercive force and lowered residual magnetic flux density. When the carbon content is less than 0.01%, the coercive force is excessively low. On the other hand, a carbon content exceeding 0.09% should be avoided because the residual magnetic flux density is remarkably deteriorated although the coercive force is large.

The silicon content should be not more than 1.0%. Silicon functions to enhance the hardness of the steel sheet and is effective in preventing creation of a defect by folding at the time of handling of the steel sheet. Addition of silicon in an excessively large amount raises a problem of cost associated with the addition of silicon. Therefore, the silicon content is limited to not more than 1.0%.

The manganese content should be not more than 1.5%. Manganese also functions to enhance the hardness of the steel sheet and is effective in preventing creation of a defect by folding at the time of handling of the steel sheet. Addition of manganese in an excessively large amount, however, raises a problem of cost associated with the addition of manganese. Therefore, the manganese content is limited to not more than 1.5%.

The phosphorus content should be not more than 0.3%. Phosphorus is effective in enhancing the hardness of the steel sheet. Phosphorus in an amount exceeding 0.3%, however, is unfavorably likely to cause cracking due to segregation in the course of production of the steel sheet.

The aluminum content should be not more than 1.0%. Aluminum also is effective in enhancing the hardness of the steel sheet. Aluminum in an excessively large amount, however, unfavorably raises a problem of cost associated with the addition of aluminum. For the above reason, the aluminum content is limited to not more than 1.0%.

The sulfur content is limited to not more than 0.04%. The lower the sulfur content, the better the retention of the degree of vacuum in the interior of the TV cathode-ray tube. For this reason, the sulfur content should be not more than 0.04%.

The nitrogen content is limited to not more than 0.01%. When it is excessively large, a defect called "blister" is created on the surface of the steel sheet. The lower limit of the nitrogen content on the creation of blister is 0.01%.

Regarding other elements, addition of antimony, tin, boron, copper, bismuth, titanium, tellurium, niobium, nickel, and chromium, which are known as elements for improving the magnetic properties of non-oriented electrical sheets, may be added, without detriment to the effect of the present invention, in order to improve the magnetic shielding properties. For each of these elements, the amount is preferably not more than 0.2% from the viewpoint of the cost associated with the addition of these elements.

Next, the production process according to the present invention will be described.

Steelmaking, hot rolling, pickling, cold rolling and the like involved in the production process may be carried out by conventional methods.

For example, a slab regulated to the above composition is heated to 1000° to 1300° C., hot rolled with the finish temperature being 600° to 1100° C., coiled in the temperature range of 500° to 850° C., and cold rolled to prepare a 0.1 to 0.5 mm-thick cold rolled sheet which is then continuously annealed. Pickling is performed before the cold rolling.

The continuous annealing is regulated so that the grain diameter of the steel sheet is 3 to 15 μm. There is a tendency that the coercive force decreases with increasing the grain diameter. The residual magnetic flux density becomes a maximum when the grain diameter is in a predetermined range. A grain diameter of less than 3 μm is unacceptable because the residual magnetic flux density is deteriorated. On the other hand, a grain diameter exceeding 15 μm should be avoided because the coercive force is excessively low. For this reason, heat treatment conditions, although they vary depending upon the constituents of the steel sheet and the amount of inclusions, are suitably such that the temperature is about 550° to 900° C. and the soaking time is one sec to 5 min. Atmospheres usable herein include nonoxidizing gases such as nitrogen, hydrogen, and argon commonly used in the art.

In the continuous annealing, lowering the tension applied to the steel sheet in the furnace leads to increased residual magnetic flux density in the widthwise direction of the steel sheet. Therefore, a limitation of the tension applied to the steel sheet in the furnace to 0.1 to 0.9 kg/mm$^2$ is preferred. When the tension is less than 0.1 kg/mm$^2$, meander in the widthwise direction is likely to occur during travel of the steel sheet. On the other hand, when it exceeds 0.9 kg/mm$^2$, the residual magnetic flux density in the widthwise direction of the steel sheet is not improved.

Although the annealing of the cold rolled steel sheet has been described above in terms of continuous annealing, it is a matter of course that the annealing may be box or pack annealing. In this case, the annealing is performed in the temperature range of 500° to 900° C. for 10 min to 10 hr.

After the completion of the hot rolling, the hot rolled steel sheet may be annealed in the temperature range of 500° to 1000° C. from the viewpoint of improving the residual magnetic flux density.

After the continuous annealing, the annealed steel sheet is temper rolled with a reduction ratio of not more than 3%. This temper rolling may be omitted in the case of a steel sheet which has been solid solution strengthened by the addition of silicon or aluminum and raises no problem of shape after continuous annealing. An increase in reduction ratio in the temper rolling results in increased strength of the steel sheet and increased coercive force. In this case, however, the residual magnetic flux density is deteriorated. The upper limit of the reduction ratio is 3% from the viewpoint of the residual magnetic flux density.

This steel sheet is then plated with chromium or nickel. The purpose of the plating is to prevent rusting and to retain the vacuum in the cathode-ray tube. When the carbon content is high as in the material of the present invention, plating is important. Chromium or nickel plating serves to prevent release of CO or $CO_2$ gas. Plating conditions are not particularly limited. In the case of chromium plating, however, a metallic chromium is not only plated but a hydrated oxide of chromium as a surface layer and metallic chromium as an inner layer is deposited on the surface of the steel sheet. The coverage in this case is suitably 3 to 20 mg/m$^2$ for the hydrated oxide of chromium and 50 to 250 mg/m$^2$ for the metallic chromium. In the case of nickel plating, the coverage is preferably 0.5 to 3 g/m$^2$ which is commonly adopted in the art. Further, a chromium plating can be deposited at a conventional coverage, about 3 to 250 mg/m$^2$, on the nickel plating in order to improve the corrosion resistance. Thus, the plating is limited to chromium or nickel plating because chromium and nickel pose no problem of evolution of a gas in vacuo.

As described above in detail, according to the present invention, improving the coercive force and the residual magnetic flux density, that is, regulating the coercive force to more than at least 1.8 Oe and the value obtained by multiplying the coercive force and the residual magnetic flux density to not less than 20, can bring the drift in electron beam landing to not more than 50 μm. In this case, a deterioration in degaussing properties derived from an improvement in coercive force can be compensated for by other means, for example, by increasing the number of turns of a degaussing coil and the flow of current.

EXAMPLES

Slabs having various chemical compositions listed in Table 1 were prepared by casting, heated at 1100° C., and hot rolled to 2.5 mm-thick hot rolled sheets which were then pickled and cold rolled. The cold rolled sheets were degreased, continuously annealed to regulate the grain diameter as indicated in Table 1, and temper rolled with a reduction ratio as indicated in Table 1 to prepare 0.30 mm-thick steel sheets. Subsequently, chromium plating was performed at a coverage of metallic chromium of 100 $mg/m^2$ and a coverage of a hydrated oxide of chromium of 7 $mg/m^2$. The steel sheets were then sheared into Epstein samples (30 mm in width×320 mm) of electromagnetic steel sheets. Samples in the L direction and samples, in the C direction, of which the number is equal to the number of the L direction samples were subjected to measurements of the coercive force (Hc) and the residual magnetic flux density (Br) at the maximum magnetization 10 Oe in direct current magnetization. The results are summarized in Table 1. The products were fabricated into inner shielding components which were used to prepare 29-in. aperture grill TVs which were then examined on electron beam landing properties in a field which was a simulation of the geomagnetic field. The degrees of deviation of landing site from the landing site in the case of freedom from the external magnetism in various directions were averaged to determine a drift. The results are also summarized in Table 1. The grain diameter was measured as an average value of data obtained by observation of microstructure of the section of the steel sheet under an optical microscope.

As is apparent from the above table, only samples wherein the chemical composition falls within the scope of the present invention and, at the same time, the grain diameter and the reduction ratio (including zero) in the temper rolling fall within the scope of the present invention, exhibited excellent drift properties.

Experiment Nos. 1 to 8 demonstrate that Hc increases with increasing the carbon content and that a carbon content exceeding 0.09% results in deteriorated Br.

Experiment Nos. 9 to 14 demonstrate that Hc decreases with increasing the grain diameter and that a grain diameter in a proper range can offer increased Br.

We claim:

1. A magnetic shielding material, for a television cathode-ray tube, comprising:

a steel sheet comprising by weight carbon: 0.01 to 0.09%, silicon: not more than 1.0%, phosphorus: not more than 0.3%, manganese: not more than 1.5%, sulfur: not more than 0.04%, aluminum: not more than 1.0%, and nitrogen: not more than 0.01% with the balance consisting of iron and unavoidable impurities; said steel sheet having a microstructure comprising the average grain diameter of 3 to 15 μm, and having a thickness of 0.1 to 0.5 mm and a strain corresponding to a reduction ratio in temper rolling of not more than 3%; and a chromium or nickel plating provided on the surface of the steel sheet.

2. The magnetic shielding material according to claim 1, which further comprises at least one element selected from the group consisting of antimony, tin, boron, copper, bismuth, titanium, tellurium, niobium, nickel, and chromium, said elements being contained in respective amounts of not more than 0.2%.

3. The magnetic shielding material according to claim 1, wherein a chromium layer is provided on the nickel plating on the surface of the steel sheet.

4. A process for producing a magnetic shielding material for a television cathode-ray tube, comprising the steps of:

heating a slab comprising by weight carbon: 0.01 to 0.09%, silicon: not more than 1.0%, phosphorus: not

TABLE 1

| Experiment No. | C | Si | Al | Mn | P | S | N | Cu | Ni | Particle diameter μm | Reduction ratio in temper rolling % | Hc Oe | Br Kg | Drift μm | Remarks |
|---|---|---|---|---|---|---|---|---|---|---|---|---|---|---|---|
| | Constituent (wt %) | | | | | | | | | | | | | | |
| 1 | 0.0016 | 0.3 | 0.003 | 0.35 | 0.02 | 0.026 | 0.003 | 0.01 | 0.01 | 5.7 | 1.0 | 1.7 | 9.5 | 73 | Comp. Ex. |
| 2 | 0.0097 | 0.3 | 0.003 | 0.35 | 0.02 | 0.026 | 0.003 | 0.01 | 0.01 | 5.9 | 1.0 | 2.1 | 9.5 | 59 | Comp. Ex. |
| 3 | 0.0108 | 0.3 | 0.003 | 0.35 | 0.02 | 0.026 | 0.003 | 0.01 | 0.01 | 5.5 | 1.0 | 3.2 | 9.8 | 49 | Ex. |
| 4 | 0.0256 | 0.3 | 0.003 | 0.35 | 0.02 | 0.026 | 0.003 | 0.01 | 0.01 | 5.8 | 1.0 | 3.7 | 10.7 | 43 | Ex. |
| 5 | 0.0573 | 0.3 | 0.003 | 0.35 | 0.02 | 0.026 | 0.003 | 0.01 | 0.01 | 6.2 | 1.0 | 4.0 | 8.8 | 40 | Ex. |
| 6 | 0.0878 | 0.3 | 0.003 | 0.35 | 0.02 | 0.026 | 0.003 | 0.01 | 0.01 | 5.9 | 1.0 | 4.3 | 6.8 | 45 | Ex. |
| 7 | 0.0933 | 0.3 | 0.003 | 0.35 | 0.02 | 0.026 | 0.003 | 0.01 | 0.01 | 5.5 | 1.0 | 4.7 | 3.8 | 52 | Comp. Ex. |
| 8 | 0.1283 | 0.3 | 0.003 | 0.35 | 0.02 | 0.026 | 0.003 | 0.01 | 0.01 | 6.1 | 1.0 | 5.9 | 3.3 | 68 | Comp. Ex. |
| 9 | 0.0670 | 0 | 0.043 | 0.21 | 0.03 | 0.015 | 0.005 | 0.01 | 0.01 | 2.3 | 2.2 | 5.1 | 3.9 | 62 | Comp. Ex. |
| 10 | 0.0670 | 0 | 0.043 | 0.21 | 0.03 | 0.015 | 0.005 | 0.01 | 0.01 | 3.0 | 2.2 | 4.6 | 4.7 | 49 | Ex. |
| 11 | 0.0670 | 0 | 0.043 | 0.21 | 0.03 | 0.015 | 0.005 | 0.01 | 0.01 | 7.3 | 2.2 | 3.9 | 10.6 | 45 | Ex. |
| 12 | 0.0670 | 0 | 0.043 | 0.21 | 0.03 | 0.015 | 0.005 | 0.01 | 0.01 | 14.3 | 2.2 | 2.9 | 8.2 | 48 | Ex. |
| 13 | 0.0670 | 0 | 0.043 | 0.21 | 0.03 | 0.015 | 0.005 | 0.01 | 0.01 | 15.8 | 2.2 | 2.6 | 7.6 | 51 | Comp. Ex. |
| 14 | 0.0670 | 0 | 0.043 | 0.21 | 0.03 | 0.015 | 0.005 | 0.01 | 0.01 | 26.7 | 2.2 | 1.5 | 7.1 | 56 | Comp. Ex. |
| 15 | 0.0835 | 0.1 | 0.027 | 0.98 | 0.01 | 0.002 | 0.001 | 0.01 | 0.01 | 4.3 | 0 | 1.9 | 11.5 | 40 | Ex. |
| 16 | 0.0835 | 0.1 | 0.027 | 0.98 | 0.01 | 0.002 | 0.001 | 0.01 | 0.01 | 4.3 | 1.5 | 2.6 | 9.6 | 38 | Ex. |
| 17 | 0.0835 | 0.1 | 0.027 | 0.98 | 0.01 | 0.002 | 0.002 | 0.01 | 0.01 | 4.3 | 2.8 | 3.5 | 7.2 | 47 | Ex. |
| 18 | 0.0835 | 0.1 | 0.027 | 0.98 | 0.01 | 0.002 | 0.001 | 0.01 | 0.01 | 4.3 | 3.3 | 3.8 | 5.1 | 52 | Comp. Ex. |
| 19 | 0.0455 | 0 | 0.038 | 0.33 | 0.02 | 0.011 | 0.005 | 0.18 | 0.19 | 5.9 | 0.3 | 4.2 | 10.3 | 37 | Ex. |

Note:
Underlined numerical value is outside tbe scope of the present invention.

more than 0.3%, manganese: not more than 1.5%, sulfur: not more than 0.04%, aluminum: not more than 1.0%, and nitrogen: not more than 0.01% with the balance consisting of iron and unavoidable impurities and hot rolling the slab;

cold rolling the hot rolled sheet to a cold rolled sheet having a thickness of 0.1 to 0.5 mm;

annealing the cold rolled sheet to cause recrystallization, thereby forming a texture having an average grain diameter of 3 to 15 μm;

temper rolling the annealed sheet with a reduction ratio of not more than 3%; and plating the surface of the temper rolled sheet with chromium or nickel.

5. The process according to claim 4, wherein, instead of the chromium or nickel plating on the surface of the temper rolled sheet, the surface of the cold rolled sheet is plated with chromium or nickel.

6. The process according to claim 4 or 5, wherein the surface of the nickel plating layer provided on the cold rolled sheet or temper rolled sheet is plated with a chromium.

* * * * *